United States Patent
Schroeder et al.

(10) Patent No.: US 12,464,967 B2
(45) Date of Patent: Nov. 11, 2025

(54) SYSTEM AND METHOD FOR DETERMINING SURFACE FINISH WITHIN AN AGRICULTURAL FIELD

(71) Applicant: CNH Industrial America LLC, New Holland, PA (US)

(72) Inventors: Brittany Schroeder, Bunker Hill, IN (US); Joshua D. Knoblauch, Lowpoint, IL (US)

(73) Assignee: CNH Industrial America LLC, New Holland, PA (US)

( * ) Notice: Subject to any disclaimer, the term of this patent is extended or adjusted under 35 U.S.C. 154(b) by 333 days.

(21) Appl. No.: 18/071,139

(22) Filed: Nov. 29, 2022

(65) Prior Publication Data
US 2024/0172579 A1    May 30, 2024

(51) Int. Cl.
*A01B 79/00*    (2006.01)
*G01S 17/89*    (2020.01)

(52) U.S. Cl.
CPC .......... *A01B 79/005* (2013.01); *G01S 17/89* (2013.01)

(58) Field of Classification Search
CPC ...... A01B 79/005; A01B 69/001; G01S 17/89
See application file for complete search history.

(56) References Cited

U.S. PATENT DOCUMENTS

| | | | |
|---|---|---|---|
| 10,123,475 B2* | 11/2018 | Posselius | A01B 79/005 |
| 11,357,153 B2* | 6/2022 | Foster | G06T 7/0006 |
| 11,385,338 B2 | 7/2022 | Stanhope | |
| 2018/0210450 A1* | 7/2018 | Ferrari | G06T 7/001 |
| 2020/0029490 A1* | 1/2020 | Bertucci | G06V 20/58 |
| 2021/0390284 A1* | 12/2021 | Smith | B60K 35/22 |

* cited by examiner

*Primary Examiner* — Aniss Chad
*Assistant Examiner* — Christine Nguyen Huynh
(74) *Attorney, Agent, or Firm* — Dority & Manning, P.A.

(57) ABSTRACT

An agricultural machine includes a LiDAR sensor configured to generate a three-dimensional point cloud depicting a portion of a field surface present within a field of view of the LiDAR sensor. Furthermore, the agricultural machine includes a computing system configured to receive the generated three-dimensional point cloud from the LiDAR sensor. Additionally, the computing system is configured to generate a plurality of two-dimensional point cloud slices from the received three-dimensional point cloud, with the plurality of two-dimensional point cloud slices being spaced apart from each other such that each of two-dimensional point cloud slices corresponds to a different two-dimensional plane within the received three-dimensional point cloud. Moreover, the computing system is configured to determine a surface finish parameter associated with the portion of the field surface present within the field of view of the LiDAR sensor based on the generated plurality of two-dimensional point cloud slices.

20 Claims, 6 Drawing Sheets

SYSTEM AND METHOD FOR DETERMINING SURFACE FINISH WITHIN AN AGRICULTURAL FIELD

FIELD OF THE INVENTION

The present disclosure generally relates to agricultural machines and, more particularly, to systems and methods for determining surface finish within an agricultural field using an agricultural machine.

BACKGROUND OF THE INVENTION

It is well known that, to attain the best agricultural performance from a field, a farmer must cultivate the soil, typically through a tillage operation. Modern farmers perform tillage operations using an agricultural machine, such as a tillage implement being pulled behind an agricultural work vehicle, such as a tractor. In general, tillage implements include ground-engaging tools, such as shanks, disks, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

Upon completion of the tillage operation, it is generally desirable that the surface of the field have a given surface finish, such as a given residue coverage, residue size distribution, soil clod size distribution, and/or the like. In this respect, systems for determining surface finish within an agricultural field have been developed. While such systems work well, further improvements are needed.

Accordingly, an improved system and method for determining surface finish within an agricultural field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural machine. The agricultural machine includes a frame and a LiDAR sensor supported on the frame, with the LiDAR sensor configured to generate a three-dimensional point cloud depicting a portion of a field surface present within a field of view of the LiDAR sensor. Furthermore, the agricultural machine includes a computing system communicatively coupled to the LiDAR sensor. In this respect, the computing system is configured to receive the generated three-dimensional point cloud from the LiDAR sensor. Additionally, the computing system is configured to generate a plurality of two-dimensional point cloud slices from the received three-dimensional point cloud, with the plurality of two-dimensional point cloud slices being spaced apart from each other such that each of the plurality of spaced apart two-dimensional point cloud slices corresponds to a different two-dimensional plane within the received three-dimensional point cloud. Moreover, the computing system is configured to determine a surface finish parameter associated with the portion of the field surface present within the field of view of the LiDAR sensor based on the generated plurality of two-dimensional point cloud slices.

In another aspect, the present subject matter is directed to a system for determining surface finish within an agricultural field. The system includes a LiDAR sensor configured to generate a three-dimensional point cloud depicting a portion of a field surface present within a field of view of the LiDAR sensor. Furthermore, the system includes a computing system communicatively coupled to the LiDAR sensor. In this respect, the computing system is configured to receive the generated three-dimensional point cloud from the LiDAR sensor. Additionally, the computing system is configured to generate a plurality of two-dimensional point cloud slices from the received three-dimensional point cloud, with the plurality of two-dimensional point cloud slices being spaced apart from each other such that each of the plurality of spaced apart two-dimensional point cloud slices corresponds to a different two-dimensional plane within the received three-dimensional point cloud. Moreover, the computing system is configured to determine a surface finish parameter associated with the portion of the field surface present within the field of view of the LiDAR sensor based on the generated plurality of two-dimensional point cloud slices.

In a further aspect, the present subject matter is directed to a method for determining surface finish within an agricultural field. The method includes receiving, with a computing system, a three-dimensional point cloud from a LiDAR sensor supported on an agricultural machine, with the three-dimensional point cloud depicting a portion of a field surface present within a field of view of the LiDAR sensor. Furthermore, the method includes generating, with the computing system, a plurality of two-dimensional point cloud slices from the received three-dimensional point cloud, with the plurality of two-dimensional point cloud slices being spaced apart from each other such that each of the plurality of spaced apart two-dimensional point cloud slices corresponds to a different two-dimensional plane within the received three-dimensional point cloud. Additionally, the method includes determining, with the computing system, a surface finish parameter associated with the portion of the field surface present within the field of view of the LiDAR sensor based on the generated plurality of two-dimensional point cloud slices. Moreover, the method includes initiating, with the computing system, a control action associated with adjusting an operation of the agricultural machine based on the determined surface finish parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGURES, in which.

Figure 1:
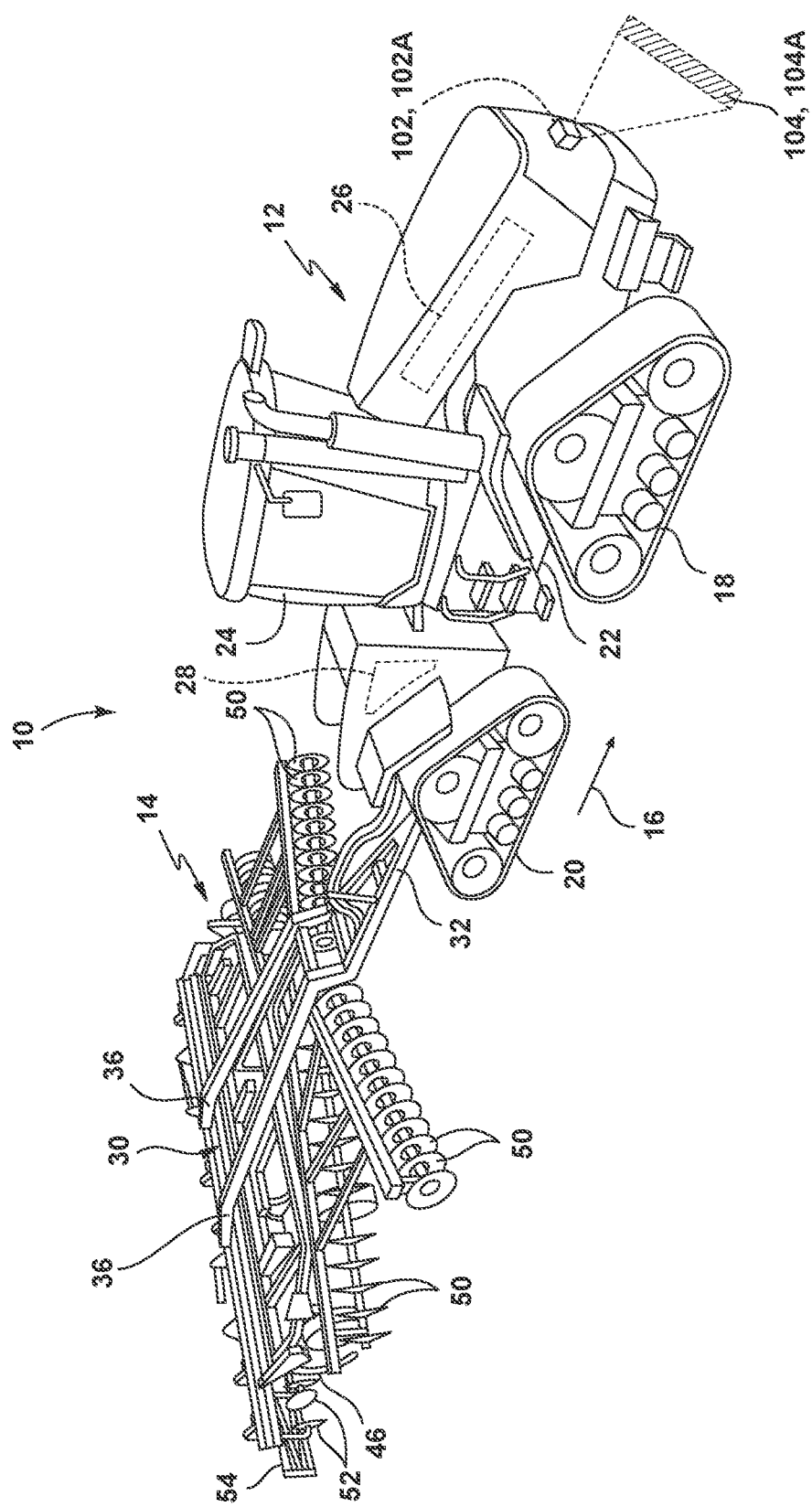
FIG. 1 illustrates a perspective view of one embodiment of an agricultural machine in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for determining surface finish within an agricultural field. More specifically, the disclosed system includes a LiDAR sensor that may be supported on an agricultural machine (e.g., an agricultural work vehicle and/or an associated agricultural implement). The LiDAR is, in turn, configured to generate a three-dimensional point cloud depicting a portion of a field surface present within its field of view.

In several embodiments, a computing system of the disclosed system is configured to determine one or more surface finish parameters associated with the portion of the field surface present within the field of view of the LiDAR sensor based on the generated point cloud. Such surface finish parameter(s) may include a residue parameter(s) (e.g., residue coverage, residue size distribution, etc.) and/or a soil clod parameter(s) (e.g., soil clod size distribution). Specifically, in such embodiments, the computing system is configured to generate a plurality of two-dimensional point cloud slices from the received three-dimensional point cloud. The two-dimensional point cloud slices are, in turn, spaced apart from each other such that each of the point cloud slices corresponds to a different two-dimensional plane within the received three-dimensional point cloud. Furthermore, the computing system is configured to analyze each of point cloud slices to determine the surface finish parameter(s). For example, in some embodiments, the computing system may identify one or more objects depicted within each point cloud slice (e.g., based on the relative positioning of the data points present within each slice). Additionally, the computing system may classify each identified object as one of a soil clod or a residue piece (e.g., based on its shape) and determine one or more characteristics (e.g., its size, length, area, etc.) of each classified object. Thereafter, the computing system may determine the surface finish parameter(s) based on the classified objects and their associated characteristic(s).

Generating a plurality of spaced apart two-dimensional point cloud slices from the three-dimensional point cloud depicting a portion of a field surface improves the determination of a surface finish parameter(s) associated with such portion of the field surface. More specifically, a three-dimensional point cloud captured by a LiDAR sensor can be analyzed to provide determinations of various surface finish parameters. Such analysis of a three-dimensional point cloud requires significant computing resources. However, as described above, with the disclosed system and method, a plurality of spaced apart two-dimensional point cloud slices are generated from the three-dimensional point cloud and then subsequently analyzed to determine the surface finish parameter(s). Analyzing a plurality of two-dimensional point cloud slices instead of the entire three-dimensional point cloud requires fewer computing resources. In this respect, the disclosed system and method provide accurate determinations of field surface finish in real-time, thereby allowing for improved control of the agricultural machine.

Figure 2:
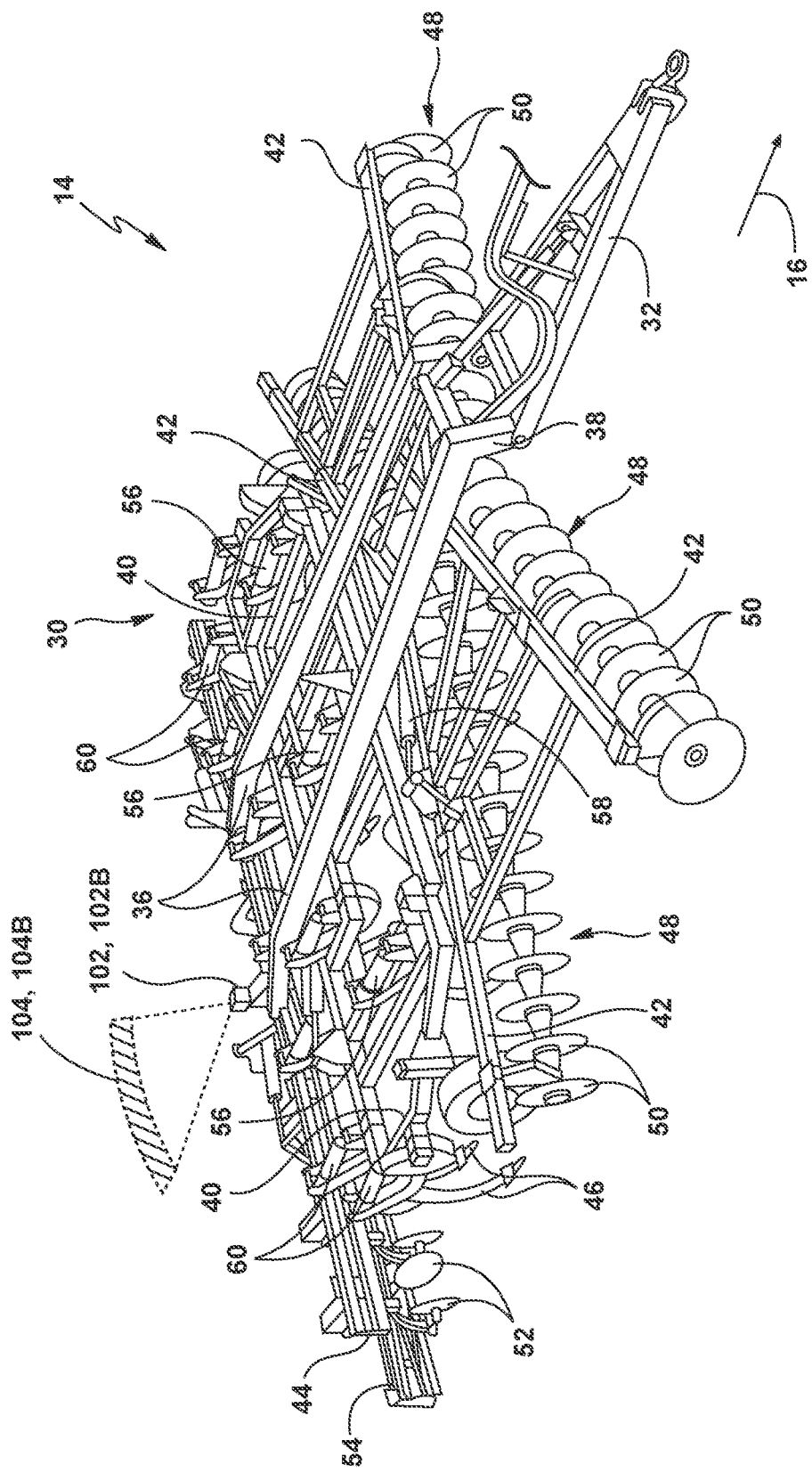
FIG. 2 illustrates another perspective view of the agricultural machine shown in FIG. 1.

Referring now to drawings, FIGS. 1 and 2 illustrate perspective views of one embodiment of an agricultural machine 10 in accordance with aspects of the present subject matter. As shown, in the illustrated embodiment, the agricultural machine 10 is configured as an agricultural work vehicle 12 and an agricultural implement 14 coupled to the vehicle 12 such that the vehicle 12 is configured to tow the implement 14 across an agricultural field in a direction of travel (e.g., as indicated by arrow 16). Furthermore, in the illustrated embodiment, the work vehicle 12 is configured as an agricultural tractor and the agricultural implement 14 is configured as a tillage implement. However, in alternative embodiments, the agricultural machine 10 may be configured as any suitable type and/or combination of agricultural equipment, such as only an agricultural vehicle, only an agricultural implement, and/or a different combination of agricultural vehicle and implement(s). Moreover, in other embodiments, the work vehicle 12 may be configured as any other suitable agricultural work vehicle. Similarly, in other embodiments, the agricultural implement 14 may be configured as any other suitable agricultural implement.

As particularly shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, the work vehicle 12 may include an engine 26 and a transmission 28 mounted on the chassis 22. The transmission 28 may be operably coupled to the engine 26 and may provide variably adjusted gear ratios for transferring engine power to the track assemblies 18, 20 via a drive axle assembly (not shown) (or via axles if multiple drive axles are employed).

Additionally, as shown in FIGS. 1 and 2, the implement 14 may generally include a carriage frame assembly 30 configured to be towed by the work vehicle 12 via a pull hitch or tow bar 32 in the travel direction 16 of the agricultural machine 10. In general, the carriage frame assembly 30 may support a plurality of ground-engaging tools, such as a plurality of shanks, disk blades, leveling blades, basket assemblies, tines, spikes, and/or the like. In several embodiments, the various ground-engaging tools may be configured to perform a tillage operation or any other suitable ground-engaging operation across the field along which the implement 14 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 relative to the travel direction 16 of the agricultural machine 10, and an aft frame 44 positioned aft of the central frame 40 relative to the travel direction 16 of the agricultural machine 10. As shown, in one embodiment, the central frame 40 may correspond to a shank frame configured to support a plurality of ground-engaging shanks 46. In such an embodiment, the shanks 46 may be configured to till or otherwise engage the soil as the implement 14 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disks 50. Specifically, the disks 50 are spaced apart from each other along the length of the disk gang 48 and configured to rotate relative to the soil within the field as the agricultural implement 14 travels across the field in the travel direction 16. Furthermore, each disk 50 may include both a concave side (not shown) and a convex side (not shown). In addition, the various gangs 48 of disks 50 may be oriented at an angle relative to the travel direction 16 of the agricultural machine 10 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality of closing disks.

In addition, the implement 14 may also include any number of suitable ground-engaging tool actuators (e.g., hydraulic or pneumatic cylinders) for adjusting the relative positioning of, the penetration depth of, and/or the force being applied to the various ground-engaging tools 46, 50, 52, 54. For instance, the implement 14 may include one or more actuators 56 coupled to the central frame 40 for raising and/or lowering the central frame 40 relative to the ground, thereby allowing the penetration depth of and/or the force being applied to the shanks 46 to be adjusted. Similarly, the implement 14 may include one or more actuators 58 coupled to the forward frame 42 to adjust the penetration depth of and/or the force being applied to the disk blades 50. Moreover, the implement 14 may include one or more actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force being applied to and/or the penetration depth of) to be adjusted.

The configuration of the agricultural machine 10 described above and shown in FIGS. 1 and 2 is provided only to place the present subject matter in an exemplary field of use. Thus, the present subject matter may be readily adaptable to any manner of agricultural machine configuration.

As shown in FIGS. 1 and 2, the agricultural machine 10 includes one or more LiDAR sensors 102 coupled thereto and/or supported thereon. More specifically, each LiDAR sensor 102 is configured to generate a three-dimensional point cloud depicting the portion of the field surface that is currently present within a corresponding field of view 104 as the agricultural machine 10 travels across the field in the direction of travel 16. As will be described below, the three-dimensional point cloud(s) generated by the LiDAR sensor(s) 102 is analyzed to determine one or more surface finish parameters associated with the surface of the field.

In general, the LiDAR sensor(s) 102 may correspond to any suitable LiDAR-based or other vision-based sensing devices configured to generate three-dimensional point cloud data depicting the surface profile of the field. Specifically, in several embodiments, the LiDAR sensor(s) 102 may correspond to a LiDAR scanner(s). In such embodiments, the LiDAR sensor(s) 102 may be configured to output light pulses from a light source (e.g., a laser outputting a pulsed laser beam) and detect the reflection of each pulse off the field surface. Based on the time of flight of the light pulses, the specific location (e.g., the three-dimensional coordinates) of the field surface relative to the LiDAR sensor(s) 102 may be calculated. By scanning the pulsed light over a given portion of the field surface, the profile of the field surface may be detected across a given portion of the field.

The LiDAR sensor(s) 102 may be mounted at any suitable location(s) on the agricultural machine 10 that allows the LiDAR sensor(s) 102 to generate three-dimensional point cloud data depicting a portion(s) of the field adjacent to the machine 10. For example, in the illustrated embodiment, a first LiDAR sensor 102A is mounted on the forward end of the work vehicle 12 such that the first LiDAR sensor 102A has a first field of view 104A directed at a portion of the field surface forward of the vehicle 12. Moreover, in the illustrated embodiment, a second LiDAR sensor 102B is mounted on the aft end of the implement 14 such that the second LiDAR sensor 102B has a second field of view 104B directed at a portion of the field surface aft of the implement 14. However, in alternative embodiments, the LiDAR sensor(s) 102 may be mounted at any other suitable location(s).

Additionally, in the illustrated embodiment, two LiDAR sensors 102 are supported on the agricultural machine 10. However, in alternative embodiments, any other suitable number of LiDAR sensors 102 may be supported or otherwise mounted on the agricultural machine 10, such as a single LiDAR sensor 102 or three or more LiDAR sensors 102.

Figure 3:
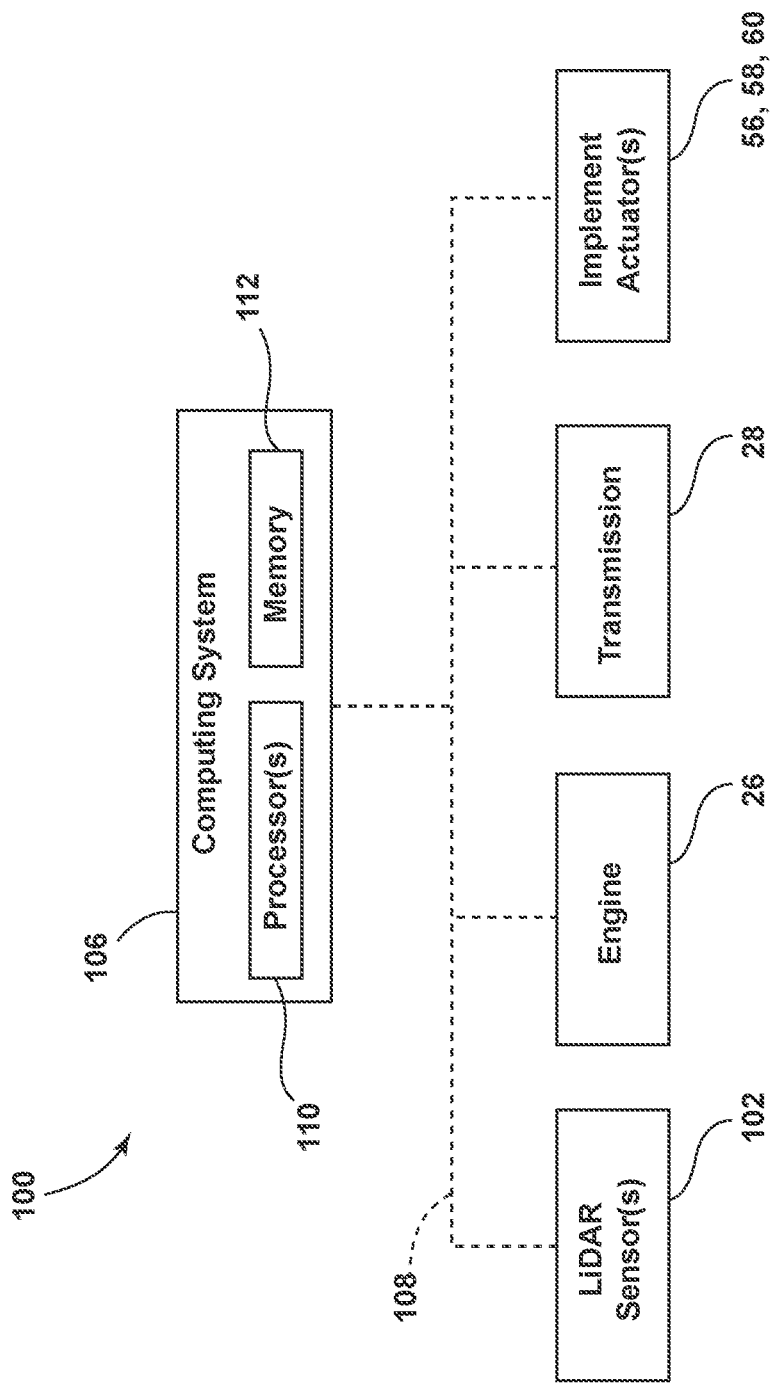
FIG. 3 illustrates a schematic view of one embodiment of a system for determining surface finish within an agricultural field in accordance with aspects of the present subject matter.

Referring now to FIG. 3, a schematic view of one embodiment of a system 100 for determining surface finish within an agricultural field is illustrated in accordance with aspects of the present subject matter. In general, the system 100 will be described herein with reference to the agricultural machine 10 described above with reference to FIGS. 1 and 2. However, it should be appreciated by those of ordinary skill in the art that the disclosed system 100 may generally be utilized with agricultural machines having any other suitable agricultural machine configuration.

As shown in FIG. 3, the system 100 includes a computing system 106 communicatively coupled to one or more components of the agricultural machine 10 and/or the system 100 to allow the operation of such components to be electronically or automatically controlled by the computing system 106. For instance, the computing system 106 may be communicatively coupled to the LiDAR sensor(s) 102 via a communicative link 108. As such, the computing system 106 may be configured to receive three-dimensional point cloud data from the LiDAR sensor(s) 102 that depicts the surface of the field. Furthermore, the computing system 106 may be communicatively coupled to the engine 26; the transmission 28; and the actuator(s) 56, 58, 60 of the implement 14 via the communicative link 108. In this respect, the computing system 106 may be configured to control the operation of the engine 26; the transmission 28; and the actuator(s) 56, 58, 60 to adjust the operation of the agricultural machine 10. In addition, the computing system 106 may be communicatively coupled to any other suitable components of the agricultural machine 10 and/or the system 100.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance such devices may be considered to form part of the computing system 106. For instance, the functions of the computing system 106 may be distributed across multiple application-specific controllers or computing devices, such as a navigation controller, an engine controller, a transmission controller, an implement controller, and/or the like. Furthermore, the communicative link 108 may correspond to a single communicative link (e.g., a CAN bus) or a plurality of communicative links (e.g., CAN bus and ISOBUS)

Figure 4:
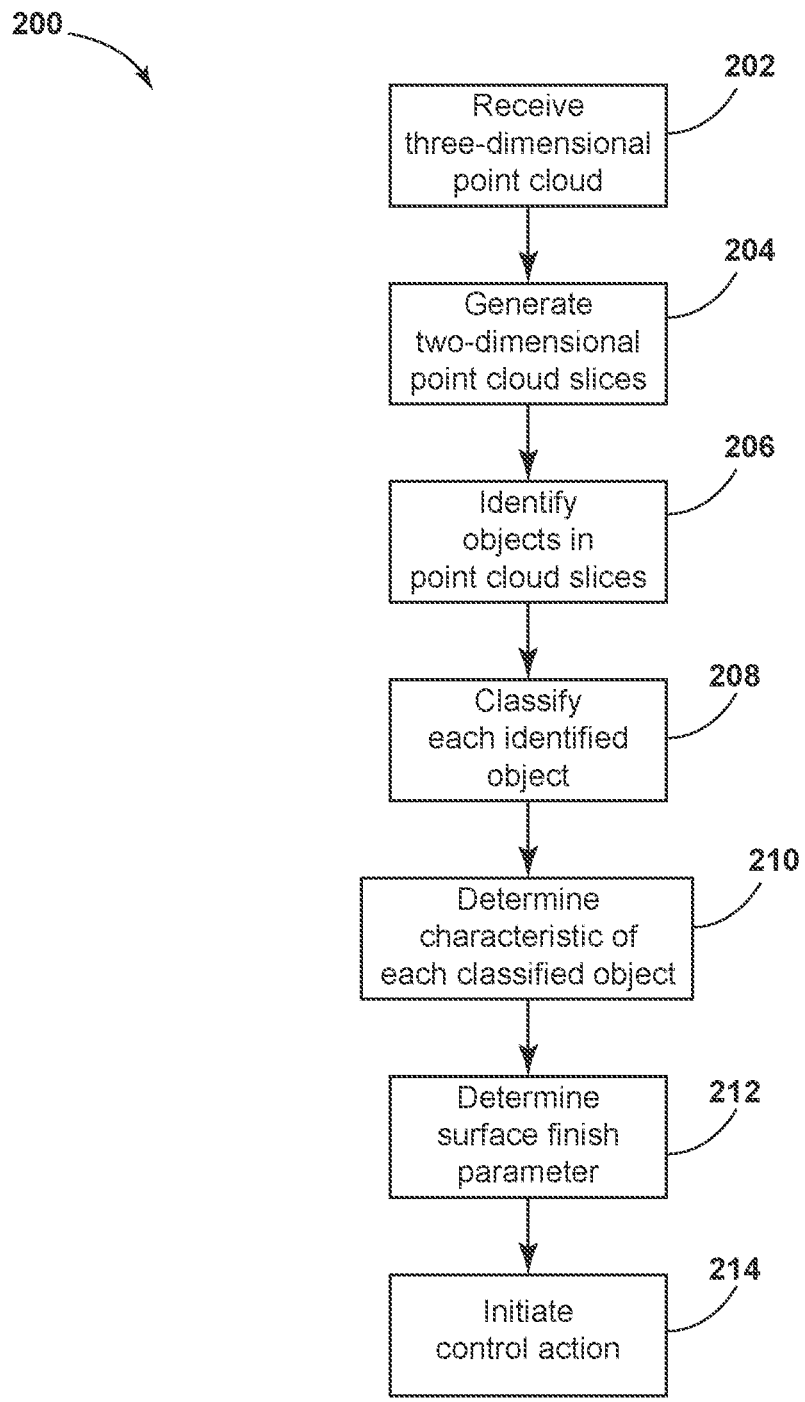
FIG. 4 illustrates a flow diagram providing one embodiment of control logic for determining surface finish within an agricultural field in accordance with aspects of the present subject matter.

Referring now to FIG. 4, a flow diagram of one embodiment of an example control logic 200 that may be executed by the computing system 106 (or any other suitable computing system) for determining surface finish within an agricultural field is illustrated in accordance with aspects of the present subject matter. Specifically, the control logic 200 shown in FIG. 4 is representative of steps of one embodiment of an algorithm that can be executed to allow for real-time determination of surface finish within an agricultural field without requiring substantial computing resources and/or processing time. However, in other embodiments, the control logic 200 may be used in association with any other suitable system, application, and/or the like for determining surface finish within an agricultural field.

As shown, at (202), the control logic 200 includes receiving a generated three-dimensional point cloud from a LiDAR sensor supported on an agricultural machine. Specifically, as mentioned above, in several embodiments, the computing system 106 may be communicatively coupled to the LiDAR sensor(s) 102 via the communicative link 108. In this respect, as the agricultural machine 10 travels across the field to perform an agricultural operation thereon, the computing system 106 may receive a three-dimensional point cloud(s) from the LiDAR sensor(s) 102. Each received three-dimensional point cloud, in turn, depicts a portion of the field surface present within the field of view 104 of the corresponding LiDAR sensor 102. As will be described below, each received three-dimensional point cloud is analyzed to determine a surface finish parameter(s) associated with the corresponding portion of the field surface.

Furthermore, at (204), the control logic 200 includes generating a plurality of two-dimensional point cloud slices from the received three-dimensional point cloud. Specifically, in several embodiments, the computing system 106 is configured to generate a plurality of two-dimensional point cloud slices from each three-dimensional point cloud received at (202). For example, the computing system 106 may be configured to execute any suitable point cloud processing algorithm(s) and/or technique(s) to generate the two-dimensional point cloud slices from the three-dimensional point cloud(s). As will be described below, each generated two-dimensional point cloud is analyzed to determine the surface finish parameter(s) associated with the field surface.

In general, each two-dimensional point cloud slice generated at (204) corresponds to a particular two-dimensional plane within the corresponding three-dimensional point cloud received at (202). That is, each two-dimensional point cloud slice includes all of and only the data points present within that particular two-dimensional plane of the corresponding three-dimensional point cloud. Furthermore, the two-dimensional point cloud slices are spaced apart from each other such that each two-dimensional point cloud slice corresponds to a different two-dimensional plane within the corresponding three-dimensional point cloud. Moreover, each two-dimensional point cloud slice is taken at or adjacent to the location within the corresponding three-dimensional point cloud where it is assumed that the field surface is positioned. In this respect, each point cloud slice provides an indication of the surfaces of the objects (e.g., residue pieces, soil clods, etc.) present at the corresponding location within the corresponding three-dimensional point cloud.

At (204), any suitable number of two-dimensional point cloud slices may be generated based on each received three-dimensional point cloud. For example, in some embodiments, five or more two-dimensional point cloud slices may be generated, such as ten or more two-dimensional point cloud slices or twenty or more two-dimensional point cloud slices in subsequent three-dimensional point clouds.

Additionally, at (206), the control logic 200 includes identifying one or more objects depicted within each of the generated plurality of two-dimensional point cloud slices. Specifically, in several embodiments, the computing system 106 is configured to analyze each two-dimensional point cloud slice generated at (204) to identify any objected depicted therein. As will be described below, the objects identified in each slice at (206) are used to determine the surface finish parameter(s) associated with the field surface.

In some embodiments, at (206), the objects depicted within each two-dimensional point cloud slice are identified based on the relative positioning of the data points present within that point cloud slice. More specifically, as described above, each two-dimensional point cloud slice includes all of the data points present on the corresponding two-dimensional plane with the corresponding three-dimensional point cloud. As such, the data points within a given point cloud slice were reflected off of a surface positioned at that location. Thus, groups of data points that are positioned close together are indicative of the presence of a surface the surface of a particular object (e.g., of a residue piece, soil clod, etc.) at that location. In this respect, the computing system 106 may determine the distance between each of the data points within a given point cloud slice. Thereafter, the computing system 106 may identify all points within a threshold distance of each other as a single object. However, in alternative embodiments, the objects depicted within each two-dimensional point cloud slice may be identified in any other suitable manner.

Moreover, at (208), the control logic 200 includes classifying each of the identified one or more objects as one of a soil clod or a residue piece. Specifically, in several embodiments, the computing system 106 is configured to analyze each object identified at (206) to classify it as one of a soil clod or a residue piece. As will be described below, the classification of each object is used to determine the surface finish parameter(s) associated with the field surface.

In some embodiments, at (208), the objects identified within each two-dimensional point cloud slice are classified based on their shape. More specifically, soil clods are generally round or oblong and have low aspect ratios (e.g., the ratio of length to width). Conversely, residue pieces are long, slender, and generally rod-like or shaft-like. Thus, residue pieces generally have higher aspect ratios. Thus, the shape of a given object identified within a two-dimensional point cloud slice is generally indicative of whether the given object is a soil clod or a residue piece. In this respect, the computing system 106 may determine the shape of or a parameter associated with the shape of (e.g., length, width, aspect ratio, curvature, etc.) each identified object. Thereafter, the computing system 106 may classify each identified object as either a soil clod or a residue piece based on the determined shape or shape parameter. For example, in one embodiment, the computing system 106 may compare the aspect ratio of each identified object to a threshold value. When the aspect ratio of a given object exceeds the threshold value, the computing system 106 may classify the given object as a residue piece. Conversely, when the aspect ratio of the given object falls below the threshold value, the computing system 106 may classify the given object as a soil clod. However, in alternative embodiments, the objects depicted within each two-dimensional point cloud slice may be identified in any other suitable manner.

Figure 5:
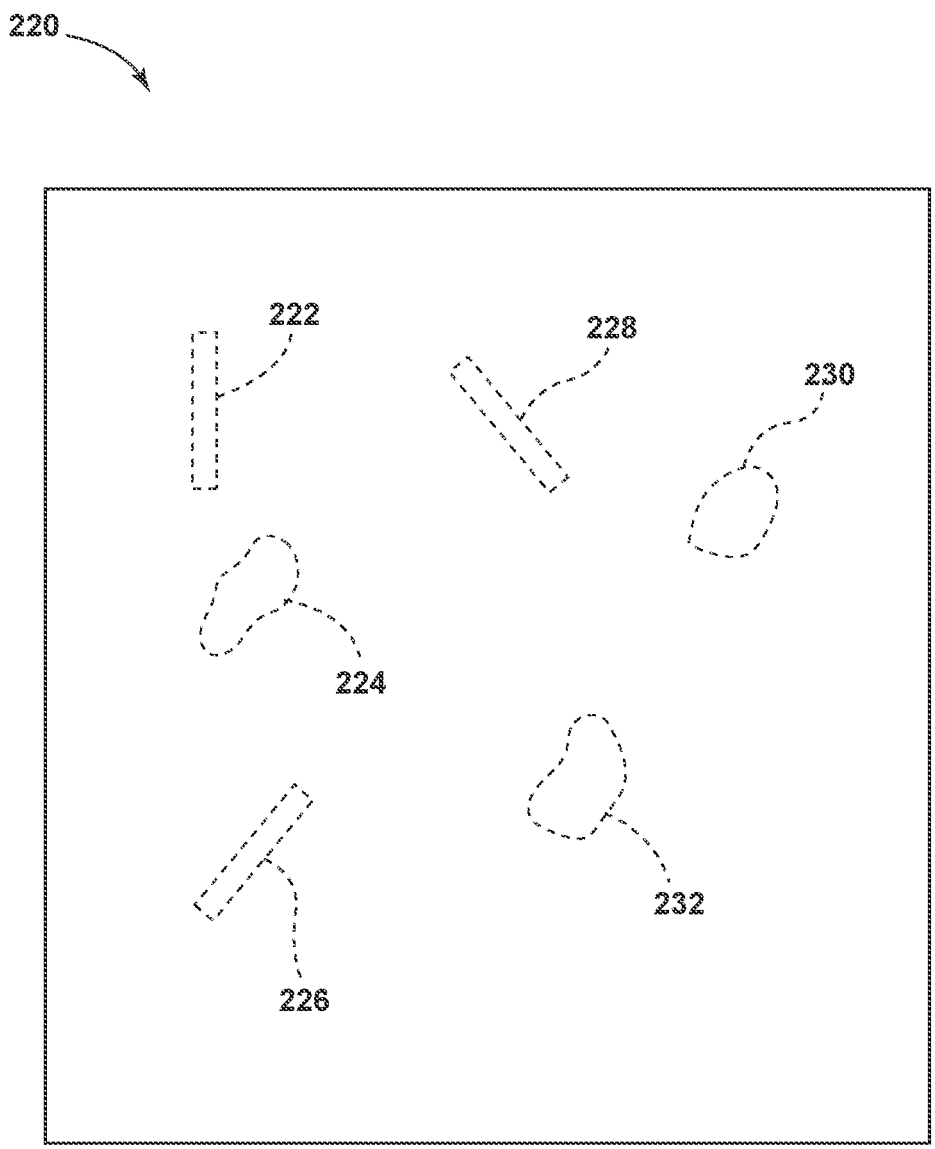
FIG. 5 illustrates an example two-dimensional point cloud slice in accordance with aspects of the present subject matter.

FIG. 5 illustrates an example two-dimensional point cloud slice 220 in accordance with aspects of the present subject matter. As shown, the point cloud slice 220 includes several identified objects depicted therein, namely objects 222, 224, 226, 228, 230, 232. In general, the objects 222, 226, 228 are rod-like shaped. Thus, the aspect ratios of the objects 222, 226, 228 exceed the threshold value such that the objects 222, 226, 228 are classified as residue pieces. Conversely, the objects 224, 230, 232 are round and/or oblong shaped. Thus, the aspect ratios of the objects 224, 230, 232 fall below the threshold value such that the objects 224, 230, 232 are classified as soil clods.

Referring again to FIG. 4, at (210), the control logic 200 includes determining a characteristic of each classified object. Specifically, in several embodiments, the computing system 106 is configured to analyze each object classified at (208) to determine one or more associated characteristics. Such characteristic(s) may include the length, width, area, orientation, and/or the like. The determined characteristic(s) is, in turn, used to determine the surface finish parameter(s). In some embodiments, the characteristic(s) determined at (210) may be based on the classification of the object at (208). For example, when a given object is classified as a residue piece, the computing system 106 may determine the length or longest dimension of the object (e.g., to facilitate determining residue size distribution), the orientation of the object (e.g., to facilitate determining residue coverage), the area of the object (e.g., to facilitate determining residue coverage), and/or the like. Conversely, when the given object is classified as a soil clod, the computing system 106 may determine the length or longest dimension of the object (e.g., to facilitate determining soil clod size distribution), the area of the object (e.g., to facilitate determining soil clod size distribution), and/or the like. However, in alternative embodiments, any other suitable characteristic(s) of the classified objects may be determined at (210).

In addition, at (212), the control logic 200 includes determining a surface finish parameter associated with the portion of the field surface present within the field of view of the LiDAR sensor. Specifically, in several embodiments, the computing system 106 is configured to determine one or more surface finish parameter associated with the portion(s) of the field surface present within the field(s) of view 104 of the LiDAR sensor(s) 102.

Any suitable surface finish parameter(s) may be determined at (212). More specifically, in some embodiments, the surface finish parameter(s) may include a soil clod parameter(s), such as a soil clod size distribution and/or the like. For example, in one embodiment, the computing system 106 may determine the soil clod size distribution based on the area of each object classified as a soil clod. Moreover, in some embodiments, the surface finish parameter(s) may include a residue parameter(s), such as a residue size distribution, a residue coverage. For example, in one embodiment, the computing system 106 may determine the residue coverage based on the sum of the areas of the objects classified as residue pieces.

Furthermore, at (214), the control logic 200 includes initiating a control action associated with adjusting the operation of the agricultural machine based on the determined surface finish parameter(s). Specifically, in several embodiments, the computing system 106 may be configured to initiate one or more control actions associated with adjusting the operation of the agricultural machine 10 based on the surface finish parameter(s) determined at (212). For example, in one embodiment, the control action(s) include providing a notification to the operator of the agricultural machine 10 indicative of the surface finish parameter(s).

Alternatively, or additionally, the control action(s) include adjusting an operating parameter(s) of the agricultural machine 10. For example, in one embodiment, the control action(s) may include adjusting (e.g., reducing) the ground speed of the surface finish parameter(s). In such an embodiment, the computing system 106 may transmit suitable control signals to the engine 26 and/or transmission 28 of the vehicle 12 instructing the engine 26 and/or transmission 28 to adjust (e.g., reduce) the ground speed of the agricultural machine 10. In a further embodiment, the control action(s) include adjusting the position of one or more of the ground-engaging tools 46, 50, 52, 54 relative to the implement frame 30. In such an embodiment, the computing system 106 may transmit suitable control signals to the corresponding actuator(s) 56, 58, 60 of the implement 14 instructing such actuator(s) 56, 58, 60 to adjust position of the corresponding ground-engaging tool(s) 46, 50, 52, 54 relative to the implement frame 30 (e.g., to adjust the force(s) being applied to and/or the penetration depth(s) of the ground-engaging tool(s) 46, 50, 52, 54).

Figure 6:
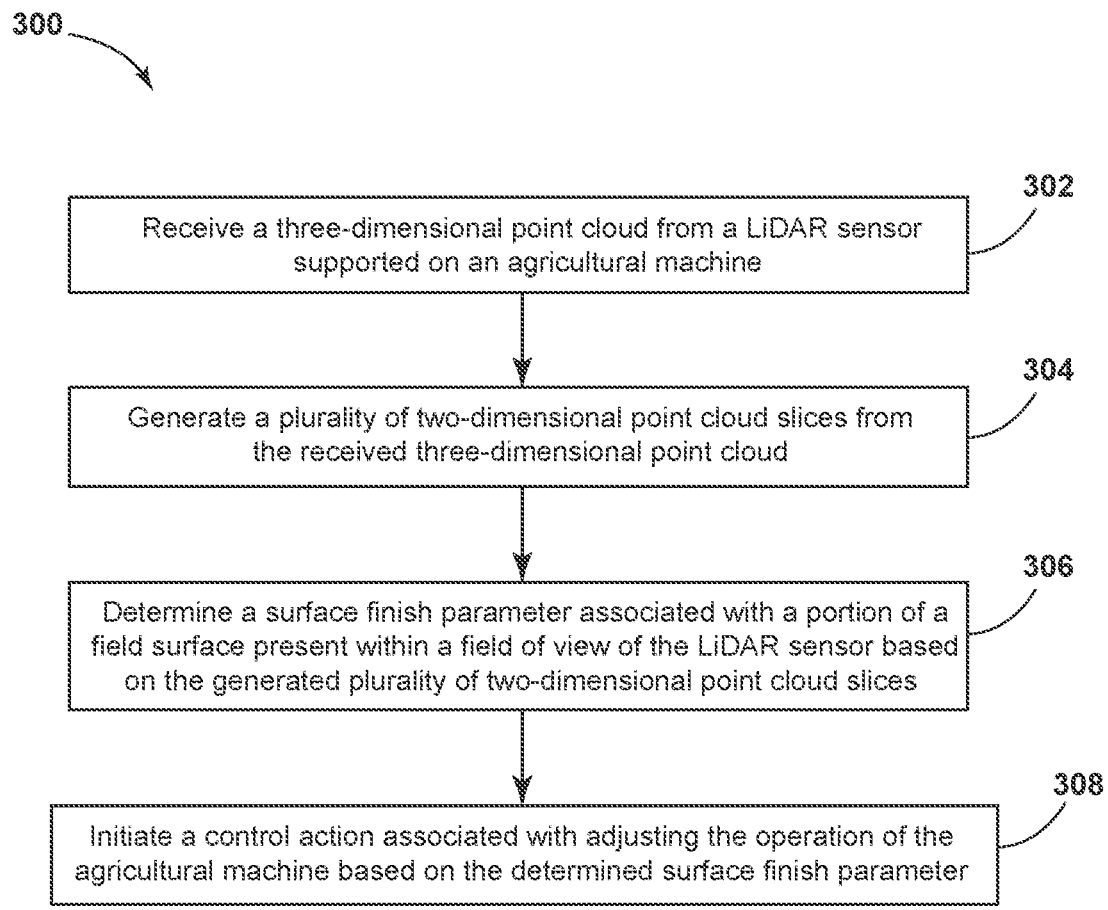
FIG. 6 illustrates a flow diagram of one embodiment of a method for determining surface finish within an agricultural field in accordance with aspects of the present subject matter.

Referring now to FIG. 6, a flow diagram of one embodiment of a method 300 for determining surface finish within an agricultural field is illustrated in accordance with aspects of the present subject matter. In general, the method 300 will be described herein with reference to the agricultural machine 10 and the system 100 described above with reference to FIGS. 1-5. However, it should be appreciated by those of ordinary skill in the art that the disclosed method 300 may generally be implemented with any agricultural machines having any suitable agricultural machine configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, a three-dimensional point cloud from a LiDAR sensor supported on an agricultural machine. For instance, as described above, the computing system 106 may be configured to receive a three-dimensional point cloud(s) from the LiDAR sensor(s) 102 supported on the agricultural machine 10.

Furthermore, at (304), the method 300 includes generating, with the computing system, a plurality of two-dimensional point cloud slices from the received three-dimensional point cloud. For instance, as described above, the computing system 106 may be configured to generate a plurality of two-dimensional point cloud slices from the received three-dimensional point cloud. The two-dimensional cloud slices are, in turn, spaced apart from each other such that each of the two-dimensional point cloud slices corresponds to a different two-dimensional plane within the received three-dimensional point cloud.

Additionally, at (306), the method 300 includes determining, with the computing system, a surface finish parameter associated with the portion of the field surface present within the field of view of the LiDAR sensor based on the generated plurality of two-dimensional point cloud slices. For instance, as described above, the computing system 106 may be configured to determine one or more surface finish parameters associated with the portion(s) of the field surface present within the field(s) 104 of view of the LiDAR sensor(s) 102 based on the generated plurality of two-dimensional point cloud slices. Such surface finish parameter(s) may include a residue parameter(s) (e.g., residue coverage, residue size distribution, etc.) and/or a soil clod parameter(s) (e.g., soil clod size distribution).

Moreover, at (308), the method 300 includes initiating, with the computing system, a control action associated with adjusting the operation of the agricultural machine based on the determined surface finish parameter. For instance, as described above, the computing system 106 may be configured to initiate one or more control actions associated with adjusting the operation of the agricultural machine 10 based on the determined surface finish parameter(s). Such control action(s) may include adjusting the ground speed of the agricultural machine 10, adjusting the force(s) being applied to or the position(s) of one or more of the ground-engaging tools 46, 50, 52, 54, and/or the like.

It is to be understood that the steps of the control logic 200 and the method 300 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 300, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system 106 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural machine, comprising:
   a frame;
   a LiDAR sensor supported on the frame, the LiDAR sensor configured to generate a three-dimensional point cloud depicting a portion of a field surface present within a field of view of the LiDAR sensor; and
   a computing system communicatively coupled to the LiDAR sensor, wherein the computing system:
   receives the generated three-dimensional point cloud from the LiDAR sensor;
   generates a plurality of two-dimensional point cloud slices from the received three-dimensional point cloud, the plurality of two-dimensional point cloud slices being spaced apart from each other such that each of the plurality of spaced apart two-dimensional point cloud slices corresponds to a different two-dimensional plane within the received three-dimensional point cloud; and determines a surface finish parameter associated with the portion of the field surface present within the field of view of the LiDAR sensor based on the generated plurality of two-dimensional point cloud slices.

2. The agricultural machine of claim 1, wherein the computing system is further configured to:

identify one or more objects depicted within each of the generated plurality of two-dimensional point cloud slices; and determine the surface finish parameter based on the identified one or more objects.

3. The agricultural machine of claim 2, wherein, when identifying the one or more objects, the computing system is configured to classify each of the identified one or more objects as one of a soil clod or a residue piece.

4. The agricultural machine of claim 1, wherein the determined surface finish parameter comprises a soil clod parameter.

5. The agricultural machine of claim 1, wherein the determined surface finish parameter comprises a residue parameter.

6. A system for determining surface finish within an agricultural field, the system comprising:

a LiDAR configured to generate a three-dimensional point cloud depicting a portion of a field surface present within a field of view of the LiDAR sensor; and a computing system communicatively coupled to the LiDAR sensor, wherein the computing system:

receives the generated three-dimensional point cloud from the LiDAR sensor;

generates a plurality of two-dimensional point cloud slices from the received three-dimensional point cloud, the plurality of two-dimensional point cloud slices being spaced apart from each other such that each of the plurality of spaced apart two-dimensional point cloud slices corresponds to a different two-dimensional plane within the received three-dimensional point cloud; and determines a surface finish parameter associated with the portion of the field surface present within the field of view of the LiDAR sensor based on the generated plurality of two-dimensional point cloud slices.

7. The system of claim 6, wherein the computing system is further configured to:

identify one or more objects depicted within each of the generated plurality of two-dimensional point cloud slices; and determine the surface finish parameter based on the identified one or more objects.

8. The system of claim 7, wherein, when identifying the one or more objects, the computing system is configured to classify each of the identified one or more objects as one of a soil clod or a residue piece.

9. The system of claim 8, wherein, when classifying each of the identified one or more objects, the computing system is configured to classify each of the identified one or more objects as one of a soil clod or a residue piece based on a shape of the corresponding object.

10. The system of claim 7, wherein, when identifying the one or more objects, the computing system is further configured to identify the one or more objects depicted within each of the plurality of generated two-dimensional point cloud slices based on a relative positioning of data points present with the corresponding two-dimensional point cloud slice.

11. The system of claim 6, wherein the determined surface finish parameter comprises a soil clod parameter.

12. The system of claim 6, wherein the determined surface finish parameter comprises a residue parameter.

13. The system of claim 6, wherein the computing system is further configured to initiate a control action associated with adjusting an operation of the agricultural machine based on the determined surface finish parameter.

14. The system of claim 13, wherein the control action comprises adjusting a ground speed of the agricultural machine.

15. The system of claim 13, wherein the control action comprises adjusting at least one of a force being applied to or a position of a ground-engaging tool supported on the agricultural machine.

16. A method for determining surface finish within an agricultural field, the method comprising:

receiving, with a computing system, a three-dimensional point cloud from a LiDAR sensor supported on an agricultural machine, the three-dimensional point cloud depicting a portion of a field surface present within a field of view of the LiDAR sensor;

generating, with the computing system, a plurality of two-dimensional point cloud slices from the received three-dimensional point cloud, the plurality of two-dimensional point cloud slices being spaced apart from each other such that each of the plurality of spaced apart two-dimensional point cloud slices corresponds to a different two-dimensional plane within the received three-dimensional point cloud;

determining, with the computing system, a surface finish parameter associated with the portion of the field surface present within the field of view of the LiDAR sensor based on the generated plurality of two-dimensional point cloud slices; and initiating, with the computing system, a control action associated with adjusting an operation of the agricultural machine based on the determined surface finish parameter.

17. The method of claim 16, further comprising:

identifying, with the computing system, one or more objects depicted within each of the plurality of generated two-dimensional point cloud slices, wherein determining the surface finish parameter comprises determining, with the computing system, the surface finish parameter based on the identified one or more objects.

18. The method of claim 17, wherein identifying the one or more objects comprises identifying, with the computing system, classify each of the identified one or more objects as one of a soil clod or a residue piece.

19. The method of claim 18, wherein classifying each of the identified one or more objects comprises classifying, with the computing system, each of the identified one or more objects as one of a soil clod or a residue piece based on a shape of the corresponding object.

20. The method of claim 17, wherein identifying the one or more objects comprises identifying, with the computing system, the one or more objects depicted within each of the plurality of generated two-dimensional point cloud slices based on a relative positioning of data points present with the corresponding two-dimensional point cloud slice.

* * * * *